C. J. ANDERSON.
FASTENER FOR SHOE LACES.
APPLICATION FILED JULY 21, 1908.

914,628.

Patented Mar. 9, 1909.

FIG. B.

WITNESSES

INVENTOR
CLAUS J. ANDERSON
BY HIS ATTORNEYS

UNITED STATES PATENT OFFICE.

CLAUS J. ANDERSON, OF NEWBURYPORT, MASSACHUSETTS.

FASTENER FOR SHOE-LACES.

No. 914,628.  Specification of Letters Patent.  Patented March 9, 1909.

Application filed July 21, 1908.  Serial No. 444,613.

*To all whom it may concern:*

Be it known that I, CLAUS J. ANDERSON, a citizen of Sweden, residing at 61½ Merrimac street, Newburyport, in the county of Essex and State of Massachusetts, have invented new and useful Improvements in Fasteners for Shoe-Laces, of which the following is a specification.

This invention relates to improvements in fastenings for shoe laces.

The accompanying drawings illustrate an embodiment of the invention.

The purposes of the invention are to provide an improved fastening having the advantages incident to the structure shown and described.

Figure 1:
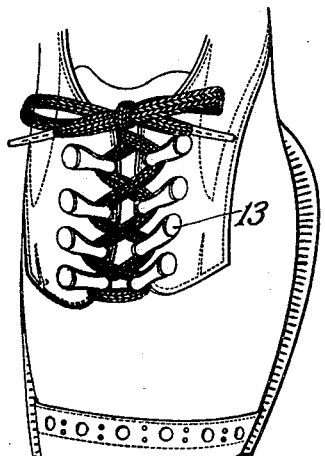
Figure 2:
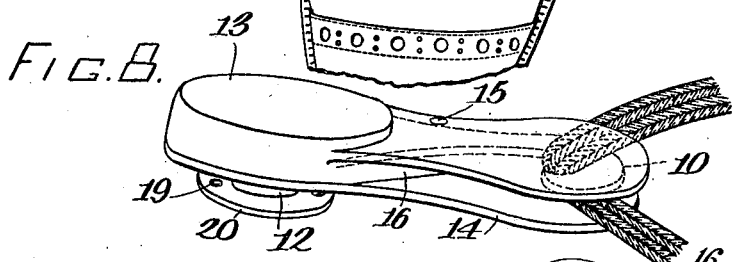
Figure 2:
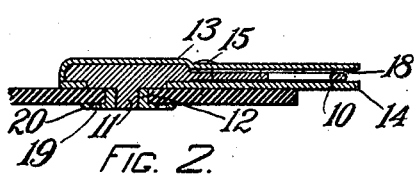
Figure 5:
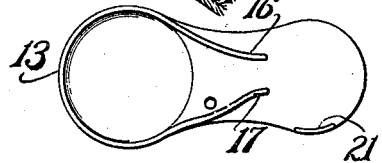
Figure 3:
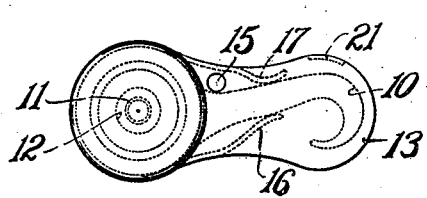
Figure 6:
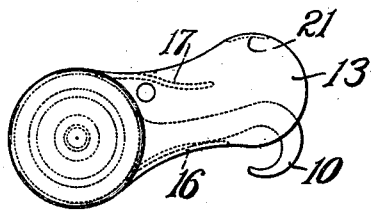
Figure 4:
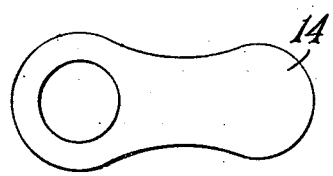
Figure 7:
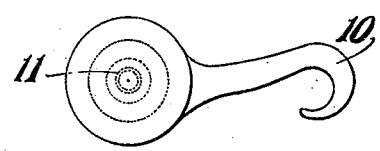

In the drawings: Figure 1 represents a shoe equipped with the improved fasteners; Fig. 2 represents a section through one of the fasteners perpendicular to the leather to which the fastener is attached; Fig. 3 represents a plan of the same; Fig. 4 represents a plan of the underplate of the same; Fig. 5 represents a plan of the top plate of the same inverted; Fig. 6 is a view similar to Fig. 3 with the hook open or unsheathed; and Fig. 7 is a plan of one of the details of the structure. Fig. 8 is a view in perspective showing a fastener greatly enlarged with a portion of shoe lace engaged therein.

Referring to the drawings, the general structure of the fastening will be understood by observing that a hook 10 is provided to receive and engage the shoe-lace, this hook being fast to and preferably integral with a stud 11 which is held in place on the shoe 9 by a screw eyelet 12. The hook, being thus rigidly supported, is inclosed by a sheath having the upper portion 13 and the under portion 14, the two being fastened together in any suitable manner, the means represented being a rivet 15. This sheath is formed of thin sheet metal. The upper part may have its side portions bent downward and inward forming springs 16, 17 which press against the shank of the hook. The shank of the hook is formed with reference to these two springs so that they engage it on opposite sides and tend to hold it centrally under the sheath, the hook being thus covered. The sheath is capable of a slight swinging motion to uncover the hook 10; and the position when so swung is shown in Fig. 6. When in this position the spring 16 tends to push it back so that the hook is again covered; and the spring 17 prevents it from going too far.

There is an opening between the two plates at the end where the lace is to enter, as shown at 18 in Fig. 2. A strut 21 at the edges of the plates may serve to hold them apart.

In lacing a shoe equipped with these fasteners, the pressure of the shoe lace against the sheath opens the sheath by swinging it aside so that the lace can be caught in the hook, and the spring 16 immediately closes it, after the lace is hooked and laid flat against the shoe. The hook is then covered by the sheath and is invisible.

It will be understood that in making the fastener sufficient space will be left between the plates 13 and 14 to admit the shoe lace as well as the hook 10. Referring particularly to Fig. 2, the thickness of the top and bottom plates has been exaggerated in order to show them clearly, and the space between them and the hook, on each side of the hook, has been correspondingly minimized; but in making a fastener, this space should be made according to the needs of the desired thickness of shoe lace, to enable the cover to return to its closed position easily after having been displaced in order to admit the lace.

The stud 11 and eylet 12 are held together in any suitable manner; but preferably they are screwed together. They may be unscrewed, and removed from a shoe in which they have been used and inserted in another shoe. To facilitate this small holes 19 are formed in the flange 20 of the eyelet portion. Into these holes a spanner may be inserted, to rotate the eyelet until screwed tight upon the stud.

Hooks of various forms and sizes may be employed in place of the specific form here shown; cover plates or sheaths of various forms may also be employed. It is among the advantages of the invention that when a shoe is equipped with this device the exterior is smooth and attractive in appearance, owing to the smooth surfaces of the sheath, with the very practical benefit that the danger of fraying the wearer's trousers or skirt is eliminated. The sheath and exposed parts may be made of silver or gold, or may be set with jewels; and, in use, the fasteners may be removed from one pair of shoes and set in another; so that the value invested in the fasteners is not lost when the shoes are worn out. This smooth and safe fastening may be laced with the speed of the exposed hooks now commonly used, and may be used with the safety of eyelets. As the hooks in the improved fastening are set closer to the edge of the leather, than eyelets or exposed hooks now common, shorter laces may be used.

I claim:—

1. The combination, in a fastening for shoe-laces, of a hook adapted to engage the lace; means to fasten the hook upon a shoe; a movable sheath adapted to cover the hook; and means to hold the sheath normally in position covering the hook.

2. A fastening for shoe-laces comprising, in combination, a hook adapted to engage the lace and means to hold the hook upon a shoe; a movable sheath adapted to cover the hook; and a spring arranged between the hook and the sheath to normally hold the sheath in position to cover the hook.

3. A fastening for shoe-laces comprising, in combination, a hook and a sheath therefor, the hook being adapted to be arranged flatwise toward the surface of a shoe and there being a pivotal joint between the hook and sheath perpendicular to said surface.

4. A fastening for shoe-laces comprising, in combination, a hook and a movable sheath therefor, the hook being adapted to be arranged flatwise toward the surface of a shoe, and the sheath being formed of two plates, one above the hook, covering the hook, and the other under the hook, between it and the shoe; there being an opening between these plates at the end where the lace may enter; and one of these plates being at the edge formed into a spring bearing on the hook and normally holding the sheath to cover the hook.

Signed by me at Boston this 15th day of July 1908.

CLAUS J. ANDERSON.

Witnesses:
EVERETT S. KENT,
JOSEPH T. BRENNAN.